April 29, 1952 G. C. SZIKLAI 2,594,517

CENTERING AND AMPLITUDE CONTROL APPARATUS FOR CATHODE-RAY BEAMS

Filed Oct. 25, 1949 3 Sheets-Sheet 1

INVENTOR
George C. Sziklai
BY
ATTORNEY

April 29, 1952 G. C. SZIKLAI 2,594,517

CENTERING AND AMPLITUDE CONTROL APPARATUS FOR CATHODE-RAY BEAMS

Filed Oct. 25, 1949 3 Sheets-Sheet 2

INVENTOR
George C. Sziklai
BY
[signature]
ATTORNEY

CENTERING AND AMPLITUDE CONTROL APPARATUS FOR CATHODE-RAY BEAMS

Filed Oct. 25, 1949 3 Sheets-Sheet 3

INVENTOR
George C. Sziklai
BY
ATTORNEY

Patented Apr. 29, 1952 2,594,517

UNITED STATES PATENT OFFICE 2,594,517

CENTERING AND AMPLITUDE CONTROL APPARATUS FOR CATHODE-RAY BEAMS

George C. Sziklai, Princeton, N. J., assignor to Radio Corporation of America, a corporation of Delaware Application October 25, 1949, Serial No. 123,374

8 Claims. (Cl. 315—21)

This invention relates to means for and methods of controlling the centering and/or deflection amplitude of a cathode ray beam.

In the art of time division multiplexing, each of a plurality of voltage waves is keyed or sampled during successive intervals and applied to a signal transmission system. This results in a signal having successive intervals that are representative of the different intelligences to be transmitted. In accordance with this invention, multiplexing may be performed at a megacycle rate.

In tubes adapted to analyze a multiplexed signal a beam of electrons may, by way of illustration, be cyclically swept back and forth at a uniform rate so as to scan two targets. Each of the targets is connected to a separate output channel that is capable of reproducing a particular intelligence. If the intensity of the beam is alternately controlled by separate intelligences in synchronism with the sweep frequency, then cross-talk between the channels would be eliminated. Inasmuch as the pulses produced by the targets are to alternate at precisely determined uniformly spaced intervals, it is apparent that the beam must strike each target at the very end of its deflection, as otherwise successive pulses from a single target may be produced. Therefore, the beam must be exactly centered at a predetermined rest position about which it is desired to oscillate and its amplitude must be precisely controlled.

In other types of apparatus where, by way of example, a wave may be coded or decoded so that each level represents a predetermined information, cathode ray tubes equipped with special targets may be conveniently used. As the position of the beam is varied in accordance with the intelligences to be coded or decoded different targets or portions thereof produce signals corresponding to a predetermined level. Therefore, if the beam is not properly centered, or if the transmission efficiency is allowed to vary, the beam will strike the wrong portion of the target and an incorrect code will be transmitted.

In accordance with the teachings of this invention, the centering of the beam and/or the amplitude of its sweep are precisely controlled by mounting "error" targets on either side of the collecting means in which the desired signal or signals is being developed. High gain amplifiers are connected to these targets and the output of these amplifiers is rectified so as to provide direct current potentials that vary in accordance with the intensity of the beam and the length of time that it strikes these targets. One of the direct current potentials is applied to the elements in the tubes which serve to deflect the beam in order that they can be properly biased and precise centering of the beam achieved. Another direct current potential can also be applied to the source of sweep voltage waves in order that their amplitude can be carefully controlled.

It is therefore an object of this invention to provide an improved means for developing voltages that may be used to control the centering and/or sweep amplitude in a cathode ray tube.

It is a further object of this invention to provide an improved means for controlling and centering the sweep amplitude of a cathode ray beam in response to the beam position.

It is still a further object of the invention to provide an improved means for multiplexing at high frequencies.

Another purpose of this invention is to provide an improved means for developing voltages for controlling the centering and deflection amplitude of a beam of electrons in response to a beam position that is useful in coding and decoding apparatus.

These and other objects will become apparent from a detailed consideration of the drawings in which.

Figure 1:
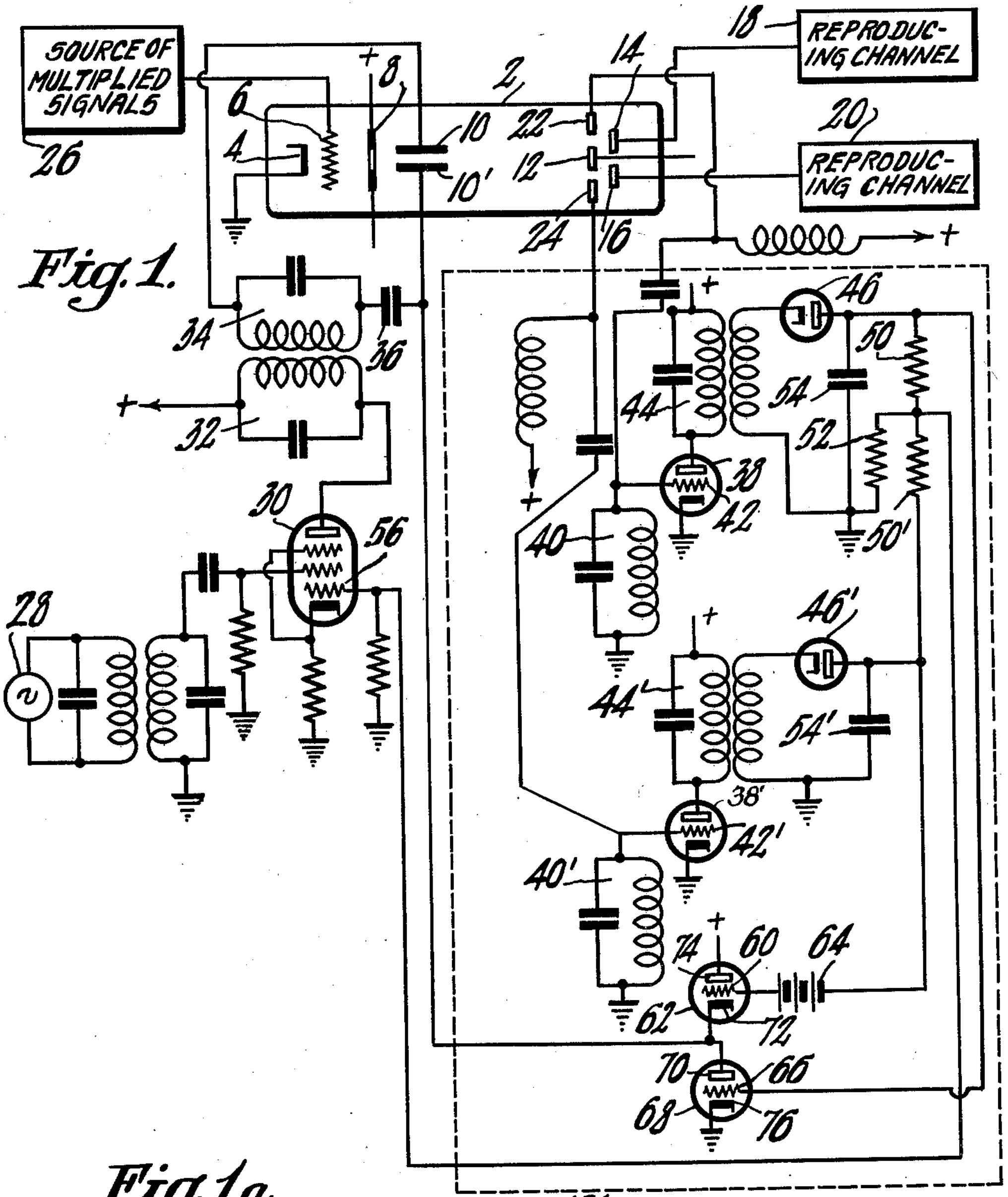
Figure 1 illustrates an application of this invention to a cathode ray tube such as may be used for separating information that is multiplexed at a high frequency.
Figure 1A:
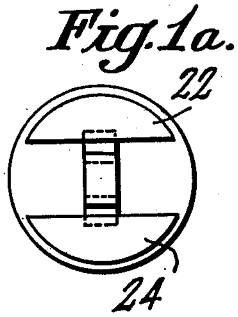
Figure 1A is an end view of the targets employed in the cathode ray tube of Figure 1.

Apparatus for precisely centering and controlling the sweep amplitude of a cathode ray beam of a tube used for separating multiplexed signals is shown in Figure 1. Such a tube may comprise an envelope 2 having mounted therein a cathode 4, a control grid 6, a beam forming anode 8, and electrostatic deflection elements 10. At the opposite end of the tube collecting means 12 is mounted so as to intercept the beam when no signals are applied to the deflection elements 10. Two other collecting means 14 and 16 are mounted on either side of the first collecting means and are connected to separate reproducing channels 18 and 20 as shown. The means 14 and 16 may operate by secondary emission, losing more electrons than they receive to the collector 12. In accordance with this invention, error targets 22 and 24 are mounted just outside the collecting means, as is best illustrated in Figure 1A, so that the beam of electrons just barely strikes them at the extreme end of a sweep.

A source multiplexed signals 26 is connected to the grid 6 so as to vary the intensity of the beam. A deflection voltage wave, which may be sinusoidal in form, is provided by a source 28 and is connected to the deflection elements 10 by an amplifier 30 having a tuned plate circuit 32 that is inductively coupled to a tuned circuit 34. One end of the latter tuned circuit is connected to one of the deflection plates and the other end is connected to the other deflection plate via condenser 36.

Error target 22 is coupled to a high gain amplifier 38 having a parallel circuit 40 that is resonant to the sweep frequency connected to its grid 42. The plate circuit of the amplifier 38 includes a similarly tuned parallel resonant circuit 44 which is inductively coupled to a rectifier 46 which may be diode as shown. The output of the diode is developed across load resistors 50 and 52 which are in series parallel relationship with storage condenser 54.

The output of the other error target 24 is amplified and rectified by a circuit operating in a manner similar to that connected to error target 22 and corresponding components are indicated by similar primed numerals. It will be noted, however, that resistor 52 is a common load to each of the rectifiers and that the rectifiers are connected in series opposition to load resistors 50 and 52. The common load resistor 52 is connected between a source of fixed potential and an intermediate point between the load resistors 50 and 50′.

This intermediate point is connected to the grid 56 of the amplifier 30 so as to provide amplitude control of the sweep voltages.

Deflection bias voltages are obtained by the following apparatus: The outer end of load resistor 50′ is connected to the grid 60 of an amplifier 62 via biasing battery 64. The outer end of load resistor 50 is connected to the grid 66 of an amplifier 68 having its plate 70 connected to the cathode 72 of amplifier 62. These amplifiers are therefore connected in series between a source of B+ potential, which is connected to the plate 74 of amplifier 62, and a source of fixed potential that is connected to the cathode 76 of amplifier 68. Bias potentials are therefore available at the junction of the cathode 72 and the plate 70 and are supplied directly to the lower deflection plate 10′ of the cathode ray tube.

The overall operation of the combined centering and sweep amplitude control systems described will now be explained. Assuming that the beam is properly centered but that its amplitude is sufficiently great to cause it to strike error targets 22 and 24 at alternate intervals, a series of pulses will be supplied to each of the amplifier-rectifier combinations described above. Inasmuch as both rectifiers draw current through the common load resistor 52 in the same direction, the terminal connected to the junction of resistors 50 and 50′ will become negative, thus placing a negative bias on grid 56 of amplifier 30 and decreasing the amplification and thereby the sweep amplitude.

It will be noted that in this condition the outer ends of resistors 50 and 50′ retain the same negative voltage, thus lowering the series-connected resistances of the amplifiers 62 and 68 by the same amount. This means that the B+ potential that is applied to plate 74 is divided in the same proportions as it would be if the beam did not strike the error targets, and therefore the bias on deflecting element 10′ remains unchanged.

However, if the beam is improperly centered, it will strike one of the error targets 22 or 24 for a greater period of time than the other and the rectified voltage appearing across resistors 50 and 50′ will not be equal. In this event, the distribution of potential between the series-connected amplifiers 62 and 68 will be altered so that the bias of deflecting element 10′ is suitably adjusted.

For example, assume that the beam is centered in an upward direction so that error target 22 is struck for a longer interval than error target 24. In this event, the output of rectifier 46 will be greater than the output of rectifier 46′ and the outer terminal of resistor 50 will be more negative than the outer terminal of resistor 50′. Accordingly, grid 66 of the lower amplifier 68 is more negative with respect to its cathode than the grid 60 with respect to its cathode 72, so that the resistance of amplifier 68 is relatively greater. This means that deflection elements 10′ will receive a more positive voltage and will lower the centering of the beam.

Although the invention has been discussed in connection with the tube for separating multiplexed signals, it will be realized that the nature of the collecting means mounted between the error targets 22 and 24 makes no difference to the operation of the invention. However, it can be said that in multiplexing tubes and coding tubes that the need for precise control of centering and sweep amplitude is far greater than it may be in other applications.

Figure 2:
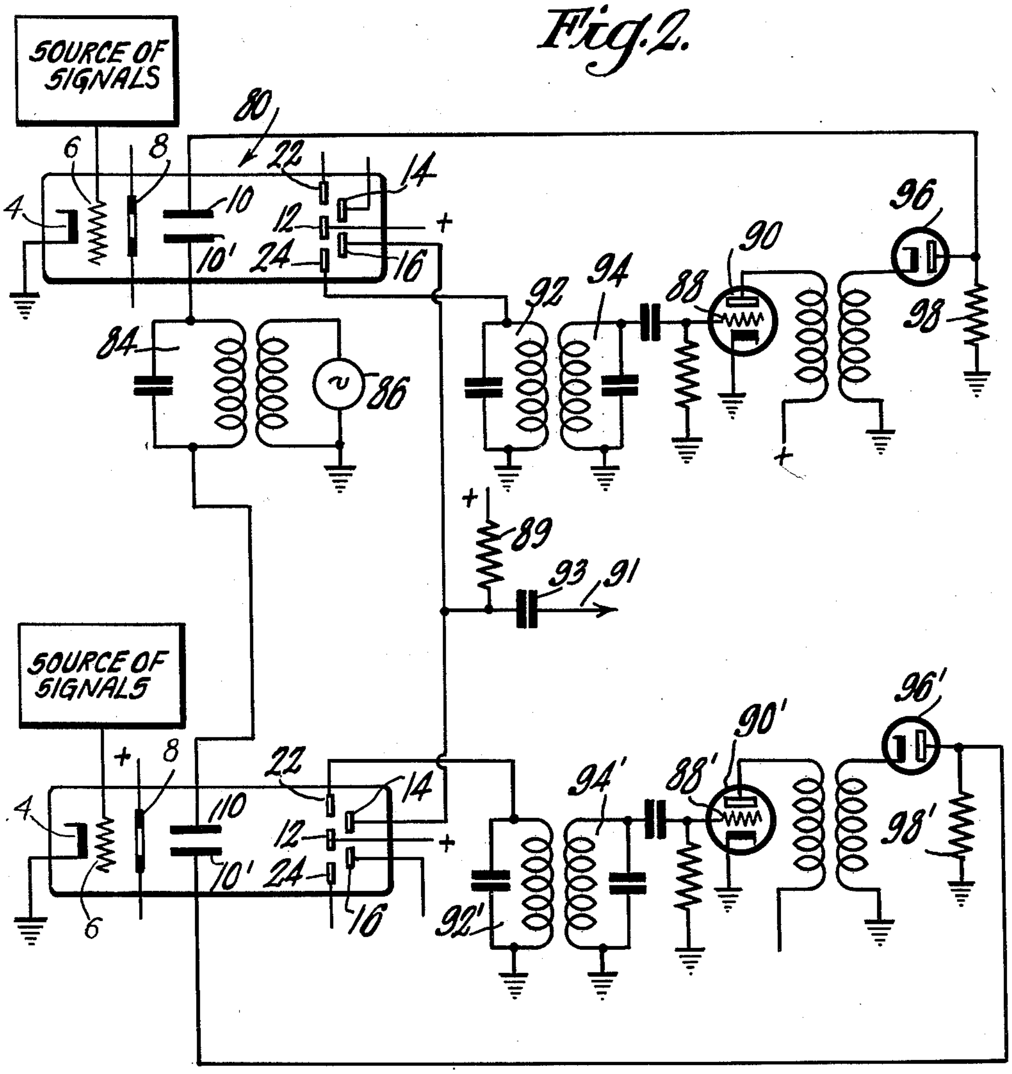
Figure 2 illustrates an application of this invention to a means in which two signals are multiplexed by use of two tubes such as illustrated in Figure 1.

Figure 2 shows a multiplexing arrangement employing the principles of the invention having a pair of tubes 80 and 82 such as described in Figure 1 that function to alternately supply voltages to a single output. Corresponding component parts of the tubes 80, 82 and the tube of Figure 1 are indicated by similar numerals. The deflection means 10 of one tube and 10′ of the other are connected in series with a parallel resonant circuit 84 which is magnetically coupled to the source of sweep voltages 86. In this way, the beams of the tubes 80 and 82 are deflected up and down in synchronism. The output targets 14 of tube 82 and 16 of tube 80 are supplied with B+ potential through a common resistor 89 and coupled to a common output circuit 90 via condenser 92. The other pair of targets 14 and 16 are not used in this particular circuit arrangement.

The "error" target 24 of tube 80 is connected to the grid 88 of a high gain amplifier 90 via coupled parallel resonant circuits 92 and 94 that are tuned to the frequency of sweep voltage generator 86. The plate circuit of the amplifier 90 is inductively coupled to a rectifier 96 which is connected in series with a load resistor 98. The voltage across the load resistor 98 is applied to the upper deflecting element 10 of tube 80.

Target 22 of tube 82 is connected to similar amplification and rectification circuits having corresponding component parts indicated by primed numerals. The voltage developed across load resistor 98' is applied to the lower deflection element 10' of tube 82.

The operation of the multiplexing apparatus just described is similar to that shown in Figure 1 with the exception that no amplitude control is necessary. The pulses formed by the beam striking the "error" targets are amplified and rectified and supplied to the deflection elements so as to maintain the extreme position of the beam opposite the signal targets that are in use. Therefore, the deflection amplitude makes no difference.

Figure 3:
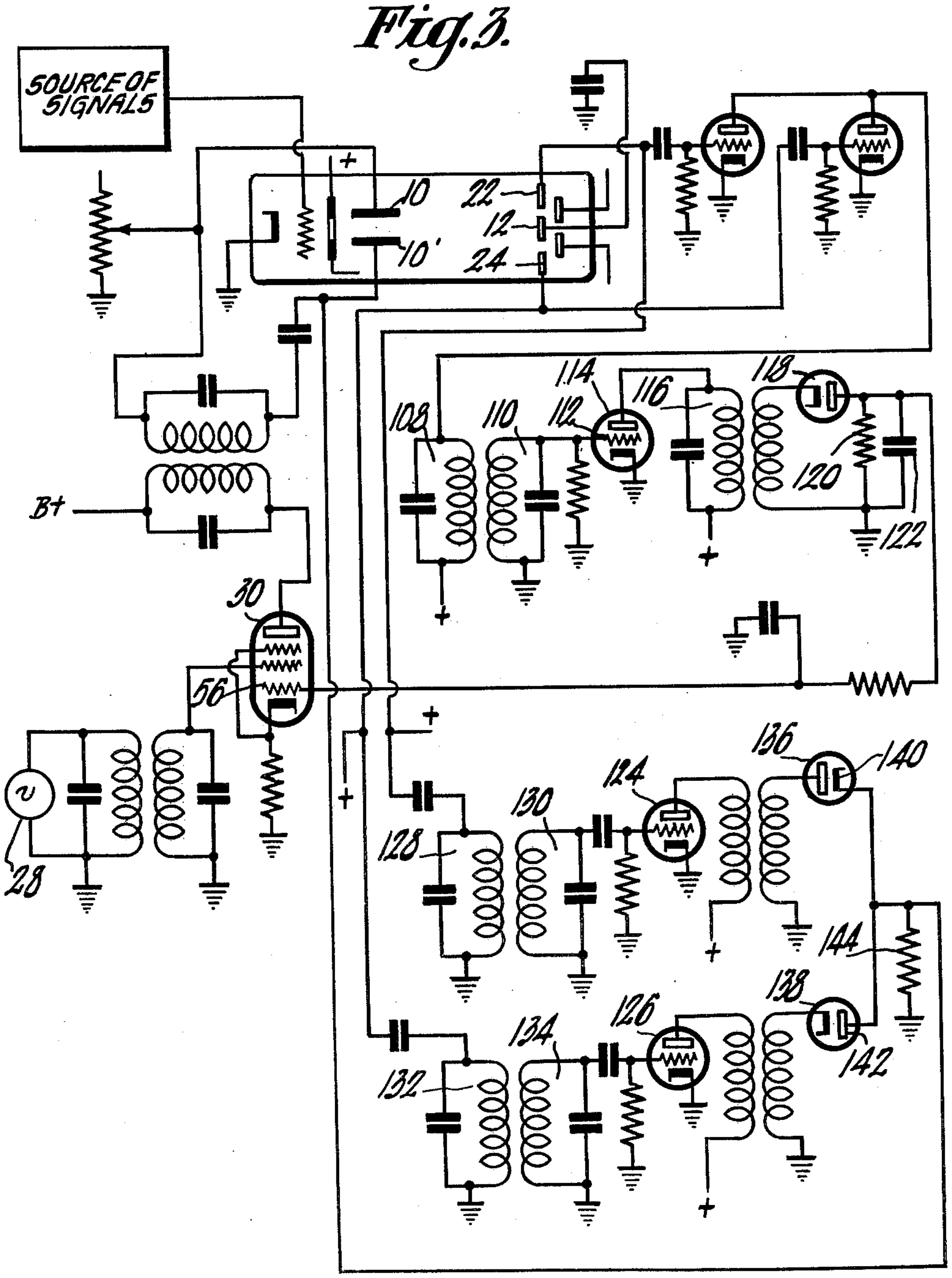
Figure 3 illustrates circuits that may be substituted for those shown in Figure 1.

Figure 3 illustrates another circuit arrangement whereby the signals developed by the "error" targets 22 and 24 may be employed to control the centering and sweep amplitude of a cathode ray beam. In this arrangement, separate circuits are employed for developing the centering and the control voltages. Inasmuch as a large portion of the apparatus shown, as well as the component parts of the cathode ray tube, are the same as those discussed in Figure 1, they will be indicated by similar numerals and detailed consideration will only be given to the different components in the following description.

"Error" target 22 is coupled via condenser 100 to the grid of an amplifier 102 and "error" target 24 is coupled via condenser 104 to the grid of an amplifier 106. The plates of the amplifiers are connected to a source of B+ potential via a parallel resonant circuit 108 that is tuned to twice the sweep frequency of source 28 of multiplexed signals. Tuned circuit 108 is inductively coupled to tuned circuit 110, and is connected between the grid 112 of high gain amplifier 114 and a source of fixed potential. The plate of the high gain amplifier 114 is connected to B+ via a similarly tuned circuit 116 which is inductively coupled to a rectifying circuit including the diode 118, resistor 120 and load condenser 122. The voltage developed across the resistance-capacitance combination is supplied to the grid 56 of the sweep voltage amplifier 30.

Assuming that the beam is properly centered but that the sweep amplitude is too large, negative voltage is developed by the rectifier 118 and applied to the grid 56 so as to lower the amplitude of the sweep voltage applied to the deflection elements 10 and 10'.

In order to establish proper centering, the targets 22 and 24 are individually coupled to high gain amplifiers 124 and 126 via coupled tuned circuits 128, 130 and 132 and 134, respectively. The output of the high gain amplifier 124 is inductively coupled to the plate of diode 136 and the plate of amplifier 126 is inductively coupled to the cathode of diode 138. The cathode 140 of diode 136 and the plate 142 of diode 138 are connected to a common load resistor 144. Inasmuch as the current drawn through the load resistor 144 by the diodes 136 and 138 is in opposite directions, the polarity of the voltage so developed will change as the centering of the beam is changed. Assuming, for example, that the beam is centered in an upward position. This means that the voltage developed by diode 136 will be greater than the voltage developed by 138 and the voltage across load resistor 144 will therefore be positive. If this is applied to the deflection element 10', the beam will be attracted to a lower position.

Figure 1B:
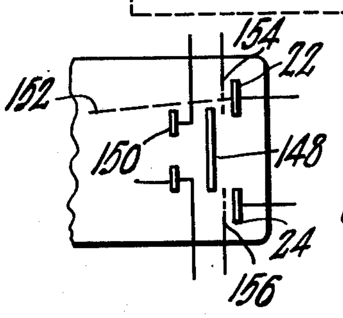
Figure 1B illustrates an alternative arrangement of targets to that illustrated in Figure 1A.

Figure 1B illustrates an arrangement for the electron collecting means and the error targets that may be employed, instead of that previously described. A beam obstructing mask 148 is inserted between electron collecting means generally indicated by the numeral 150 and the "error" targets 22 and 24. The mask is so positioned that the electron beam 152 strikes the targets 22 and 24 as soon as it is swept beyond the outer edge of the collecting means 150. The screens 154 and 156 are inserted between the mask and the error targets 22 and 24 so to collect electrons produced by secondary emission and thus increase the gain of the tube. The screens 154 and 156 may be connected to the illustrated collection circuits in the same manner as the "error" targets 22 and 24.

Having described my invention, what I claim is:

1. An apparatus for centering a beam of electrons comprising means for projecting a beam of electrons, a first error target located on one side of the rest position of said beam, a second error target located on the other side of the rest position of said beam, a first high gain amplfier having its input connected to said first target, a second high gain amplifier having its input connected to the second target, a first rectifier connected to rectify the output of said first amplifier, a second rectifier connected to rectify the output of said second amplifier, a load circuit connected between said rectifiers so that the difference between the voltage supplied by said rectifiers appears across said load circuit, a means for deflecting said electron beam in a line between said error targets, and means for connecting voltages developed in said load circuit to said beam deflecting means.

2. An apparatus for centering a beam of electrons comprising means for projecting a beam of electrons, a first target located on one side of the rest position of said beam, a second target located on the other side of the rest position of said beam, a first high gain amplifier having its input connected to said first target, a second high gain amplifier having its input connected to the second target, a first rectifier connected to rectify the output of said first amplifier, a second rectifier connected to rectify the output of said second rectifier, a load circuit connected to each of said rectifiers, means for deflecting said electron beam, a source of sweep voltage waves connected to said beam deflecting means, and means for connecting the voltages developed in said load circuit so as to control the amplitude of the sweep voltage waves provided by said source.

3. An apparatus for sweeping a beam of electrons over a predetermined range comprising means for projecting a beam of electrons, a first target located on one side of the rest position of said beam, a second target located on the other side of the rest position of said beam, a high gain amplifier connected to each of said targets, means for developing average potentials when supplied with pulsed energy, one of said means being connected to each of said amplifiers, means for deflecting said beam, a source of sweep voltage waves, said source being operatively connected to said beam deflecting means, said source also being connected to said means for developing an average potential in such manner that the amplitude of the sweep voltage waves is controlled in accordance with said average potentials.

4. An apparatus for developing a scanning control voltage for a beam of electrons comprising a means for projecting a beam of electrons, a first target located on one side of the rest position of said beam, a second target located on the other side of the rest position of said beam, a high gain amplifier connected to the first target, a rectifier, said rectifier being connected to the output of said amplifier, a second high gain amplifier connected to the second target, and a second rectifier connected to said second high gain amplifier.

5. An apparatus for deriving a control voltage that is derived from the position of an electron beam comprising means for projecting a beam of electrons, a first target located on one side of the rest position of said beam, a second target located an equal distance on the other side of said beam, a first means for developing the average potential of a series of pulses, a second means for developing the average potential of a series of pulses, a first high gain amplifier connected between said first target and said first potential developing means, a second high gain amplifier connected between said second target and said second potential developing means, and a load resistor connected to each of said means so that the voltages appearing thereon are determined by the position of the electron beam with respect to the targets.

6. A device for developing at least one control voltage in response to the position of a beam of electrons comprising means for projecting a beam of electrons, a first target, a second target, said targets being located so as to intercept the beam at the ends of its sweep, a high gain amplifier connected to said first target, a rectifier connected so as to rectify the output of said amplifier, another high gain amplifier connected to said second target, another rectifier connected so as to rectify the output of the latter amplifier, a first load impedance, said rectifiers being connected in series opposition at either end of said first load impedance, a second load impedance, said second load impedance being connected between a source of fixed potential and an intermediate point of said first load impedance.

7. Cathode ray tube apparatus comprising a cathode ray tube, at least a first and a second target mounted within said tube, deflection means for scanning a beam of electrons between said targets, means connected to said first target adapted to develop an average voltage with respect to a fixed potential in response to the beam's striking said first target, means connected to said second target adapted to develop an average voltage with respect to a fixed potential in response to the beam's striking said second target, a first load impedance connected between the outputs of said means, a second load impedance connected between an intermediate point in said first load impedance and said fixed potential, and means for controlling the amplitude of the scanning of the electron beam in response to the voltage at the intermediate point of said first impedance.

8. Cathode ray tube apparatus adapted to time division multiplex a plurality of signals comprising in combination, a first cathode ray tube having a signal target and an error target, a second cathode ray tube having a signal target and an error target, said signal target being connected to a common output circuit beam deflection, means in each tube for sweeping the beams in each of said cathode ray tubes, a source of sweep voltage connected to said deflection means so as to sweep the beams across said signal targets in opposite direction with respect to their corresponding error targets, first means for deriving a first voltage wave in response to the signals generated when the beam strikes the error target of said first tube, second means for deriving a second voltage wave in response to the signals generated when the beam strikes the error target in the second tube, means for applying the voltage derived by said first means to the deflection means of said first tube so as to change the centering of the beam and means for applying the voltage derived by said second means to the deflection means of said second tube.

GEORGE C. SZIKLAI.

REFERENCES CITED

The following references are of record in the file of this patent:

UNITED STATES PATENTS

| Number | Name | Date |
|---|---|---|
| 2,258,752 | Fewings et al. | Oct. 14, 1941 |
| 2,287,296 | Dallos | June 23, 1942 |
| 2,305,617 | Hansell | Dec. 22, 1942 |
| 2,314,302 | Ziebolz | Mar. 16, 1943 |
| 2,441,269 | Hartig | May 11, 1948 |
| 2,457,911 | Munster | Jan. 4, 1949 |
| 2,471,246 | Smith | May 24, 1949 |